United States Patent
Hellyar et al.

(10) Patent No.: US 7,346,855 B2
(45) Date of Patent: Mar. 18, 2008

(54) METHOD AND SYSTEM FOR SWITCHING BETWEEN MULTIPLE COMPUTER APPLICATIONS

(75) Inventors: Paul S. Hellyar, Kirkland, WA (US); Kelly E. Rollin, Seattle, WA (US); Daniel J. Shapiro, Redmond, WA (US); Giampiero M. Sierra, Seattle, WA (US); Jae Pum Park, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 387 days.

(21) Appl. No.: 10/027,854

(22) Filed: Dec. 21, 2001

(65) Prior Publication Data

US 2003/0117440 A1   Jun. 26, 2003

(51) Int. Cl.
*G06F 3/048* (2006.01)
(52) U.S. Cl. .................... 715/783; 715/780; 715/782; 715/802; 715/804
(58) Field of Classification Search ........ 345/781–783, 345/744–780, 802–804, 700
See application file for complete search history.

(56) References Cited

U.S. PATENT DOCUMENTS

| | | | |
|---|---|---|---|
| 4,890,257 A | 12/1989 | Anthias et al. | |
| 5,412,776 A * | 5/1995 | Bloomfield et al. | 345/783 |
| 5,463,726 A | 10/1995 | Price | |
| 5,499,334 A * | 3/1996 | Staab | 345/778 |
| 5,657,463 A | 8/1997 | Bingham | |
| 5,668,962 A * | 9/1997 | Kitami | 345/783 |
| 5,712,995 A | 1/1998 | Cohn | |
| 5,757,371 A | 5/1998 | Oran et al. | |
| 5,841,435 A | 11/1998 | Dauerer et al. | |
| 5,889,517 A | 3/1999 | Ueda et al. | |

(Continued)

FOREIGN PATENT DOCUMENTS

JP      4057089      2/1992

(Continued)

OTHER PUBLICATIONS

Blaine A. Bell and Steven K. Feiner; Dynamic Space Management for User Interfaces; pp. 1-4; www1.cs.columbia.edu/~blaine/SpaceManager/.

(Continued)

*Primary Examiner*—Steven P Sax
*Assistant Examiner*—Peng Ke
(74) *Attorney, Agent, or Firm*—Shook, Hardy & Bacon L.L.P.

(57) ABSTRACT

Generally described, a method is provided for use in a computer system that allows users to navigate quickly through multiple applications. In accordance with the method, when the computer receives a signal from the user, it extracts a preview representing a screen shot for each window open within the operating system. It then displays the preview, a description, and an icon for the next window in the activation hierarchy and a description and an icon for the remaining open windows. In other embodiments, the previews for all open windows with corresponding descriptions and icons are displayed utilizing several different arrangements. The computer then receives a designation from the user of the next window he or she wants to make active and brings to the foreground the top level window corresponding to the selection.

21 Claims, 8 Drawing Sheets

U.S. PATENT DOCUMENTS

| | | | |
|---|---|---|---|
| 6,018,340 A | 1/2000 | Butler et al. | |
| 6,025,841 A | 2/2000 | Finkelstein et al. | |
| 6,108,714 A | 8/2000 | Kumagai et al. | |
| 6,160,554 A * | 12/2000 | Krause | 345/804 |
| 6,272,484 B1 | 8/2001 | Martin et al. | |
| 6,321,209 B1 | 11/2001 | Pasquali | |
| 6,429,855 B2 * | 8/2002 | Pabon et al. | 345/172 |
| 6,489,975 B1 | 12/2002 | Patil et al. | |
| 6,590,593 B1 | 7/2003 | Robertson et al. | |
| 6,686,938 B1 | 2/2004 | Jobs et al. | |
| 6,781,611 B1 * | 8/2004 | Richard | 715/779 |
| 6,806,892 B1 | 10/2004 | Plow et al. | |
| 6,909,443 B1 | 6/2005 | Robertson et al. | |
| 6,957,395 B1 | 10/2005 | Jobs et al. | |
| 6,988,135 B2 | 1/2006 | Martin et al. | |
| 7,047,500 B2 | 5/2006 | Roelofs | |
| 7,119,819 B1 | 10/2006 | Robertson et al. | |
| 2001/0028368 A1 * | 10/2001 | Swartz et al. | 345/835 |
| 2002/0054141 A1 | 5/2002 | Yen et al. | |
| 2003/0164862 A1 | 9/2003 | Martin et al. | |
| 2005/0010876 A1 | 1/2005 | Robertson et al. | |

FOREIGN PATENT DOCUMENTS

| | | |
|---|---|---|
| JP | 7021400 | 1/1995 |
| JP | 2001222406 | 8/2001 |

OTHER PUBLICATIONS

Eser Kandogan and Ben Schneiderman; Elastic Windows for Rapid Multiple Window Management; pp. 1-2; www.cs.umd.edu/hcil/elastic-windows/.

Managing Multiple Windows; pp. 1-3; http://developer.apple.com/documentation/mac/Toolbox/Toolbox-202.html.

* cited by examiner

METHOD AND SYSTEM FOR SWITCHING BETWEEN MULTIPLE COMPUTER APPLICATIONS

STATEMENT REGARDING FEDERALLY-SPONSORED RESEARCH OR DEVELOPMENT

None.

CROSS-REFERENCE TO RELATED APPLICATIONS

None.

TECHNICAL FIELD

In general, the present invention relates to computer software, and more particularly, to a method and system that allows users to navigate quickly through multiple applications.

BACKGROUND OF THE INVENTION

Modern computer operating systems allow users to execute multiple applications at the same time. For example, it is common today for a computer user to start a messaging and organization program, leave that program running so that it can alert the user that he or she has received a message or has an appointment, and then start and use another program such as a word processor, spreadsheet and/or internet browser. When the messaging and organization program alerts the user that he or she has a message, the user can switch from the application the user is currently using to the messaging and organization program.

Some operating systems include a graphical user interface (GUI), described generally as a graphical operating system, that displays various information to the user as a combination of pictures and text which the user can manipulate. Generally, a graphical operating system displays a work area known as a desktop. The desktop is an on-screen work area that uses icons and menus to simulate the top of a desk. The intent of the desktop is to make a computer easier to use by enabling users to move pictures or objects and to start and stop tasks in much the same way as they would if they were working on a physical desktop.

In conventional graphical operating environments, files and applications are opened into rectangular spaces on a display that are called windows. "Windowing" refers to the technique in which one or more applications can be displayed to a user concurrently using portions of a display device. There can be one or more windows open on the display screen, with one window being active at any given time. One graphical operating system that utilizes windowing is the "WINDOWS" family of operating software by the "MICROSOFT CORPORATION" of Redmond, Wash.

In conventional graphical operating systems, several different methods are provided to allow a user to navigate among multiple applications. Typically, a graphical operating system will provide a notification area where an application can place an icon representing the application. Users can then select such an icon using a pointing device (e.g., a mouse) thereby bringing the window for that application to the foreground. Some applications also provide a pop-up box with a description of the application if the user hovers his or her pointing device over the application's icon. The pop-up box, however, does not appear instantaneously and may not provide enough information to the user to allow the user to decide if that icon represents the application or version of the application desired.

Another technique commonly provided for navigating among application allows users to open a dialog box containing an icon representing the open applications. A short description for a selected open application is also provided in the dialog box. The dialog box is opened through a series of key strokes. More specifically, in the WINDOWS operating software, the dialog box is opened by depressing and holding the Alt key and then pressing the Tab key. When the dialog box appears, the next window in the activation hierarchy is selected. If the Tab key is depressed again, the next window in the activation hierarchy is selected. Repeatedly pressing the Tab key allows the user to cycle through the icons displayed in the dialog box. When the Alt key is released, the window for the application icon currently selected is brought to the foreground and the dialog box is dismissed.

One problem with the current methods provided to users for navigating between open applications is that the user is not provided with enough information about the particular application. For example, a user may have the same application open several times, such as when the user is editing several different documents with the same word processing program. In this circumstance, the icon in the taskbar section and the icon displayed in the dialog box may provide the user with only the name of the application and not the particular document being edited.

As an example, a dialog box 10 is shown in FIG. 4. Dialog box 10 appears when the user depresses and holds the Alt key and presses the Tab key on the keyboard. A number of icons 12-20 are displayed that represent currently open windows. For example, icons 12, 14 and 16 may represent currently open word processing windows, such as Microsoft Word documents. Icons 18 and 20 may represent other programs, such as a web browser or spreadsheet program. When the user depresses and holds the Alt key and presses the Tab key, the box 10 will display the icons for open windows to which the user may navigate. The next application is highlighted in some fashion, as shown by 22, and a brief textual description is provided as shown at 24. Icon 14 thus represents a Microsoft Word application document. If the Alt key is released, the window for icon 14 is brought to the foreground and box 10 is no longer displayed. While this implementation affords a user with certain information about the available applications to which the user may navigate, it suffers certain drawbacks. The above-described implementation does not provide the user with any kind of window preview, which makes it difficult to determine which icon 12-20 is associated with which application window. The text provided in box 24 is helpful, but does not completely address this underlying problem.

Another problem with the current methods provided to users for navigating between open applications is that they are time consuming. In both prior methods described above, the user may be provided with some information that may allow the user to decide if a particular icon represents the application sought by the user. However, in order to access the information, the user must either wait for a pop-up box and then read the description therein or the user must read the description provided in the dialog box.

Accordingly, there exists a need for an efficient, informative method for users to navigate between open windows.

SUMMARY OF THE INVENTION

Generally described, a method is provided for use in a computer system that allows users to navigate quickly through multiple applications. In accordance with the method, when the computer receives a signal from the user, it extracts a preview representing a screen shot for each window open within the operating system. It then displays the preview, a description, and an icon for the next window in the activation hierarchy and a description and an icon for the remaining open windows. In other embodiments, the previews for all open windows with corresponding descriptions and icons are displayed utilizing several different arrangements. The computer then receives a designation from the user of the next window he or she wants to make active and brings to the foreground the top level window corresponding to the selection.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention provides a method and system for quickly and easily navigating between applications on a graphical operating system. Broadly, the invention monitors for user input indicative of a desire to navigate between open applications windows. If the input is received, a new window is displayed that contains an icon, text and a preview of the next window in the activation hierarchy. The icons for all other open windows are also displayed within the new window. The user can then navigate through the icons, viewing the preview for each icon selected. Upon receiving input indicative of a desire to select an application window for full viewing, the invention brings the selected icon's corresponding window to the foreground and the new window is no longer displayed. Having briefly described an embodiment of the present invention, an exemplary operating environment for the present invention is described below.

Exemplary Operating Environment

Figure 1:
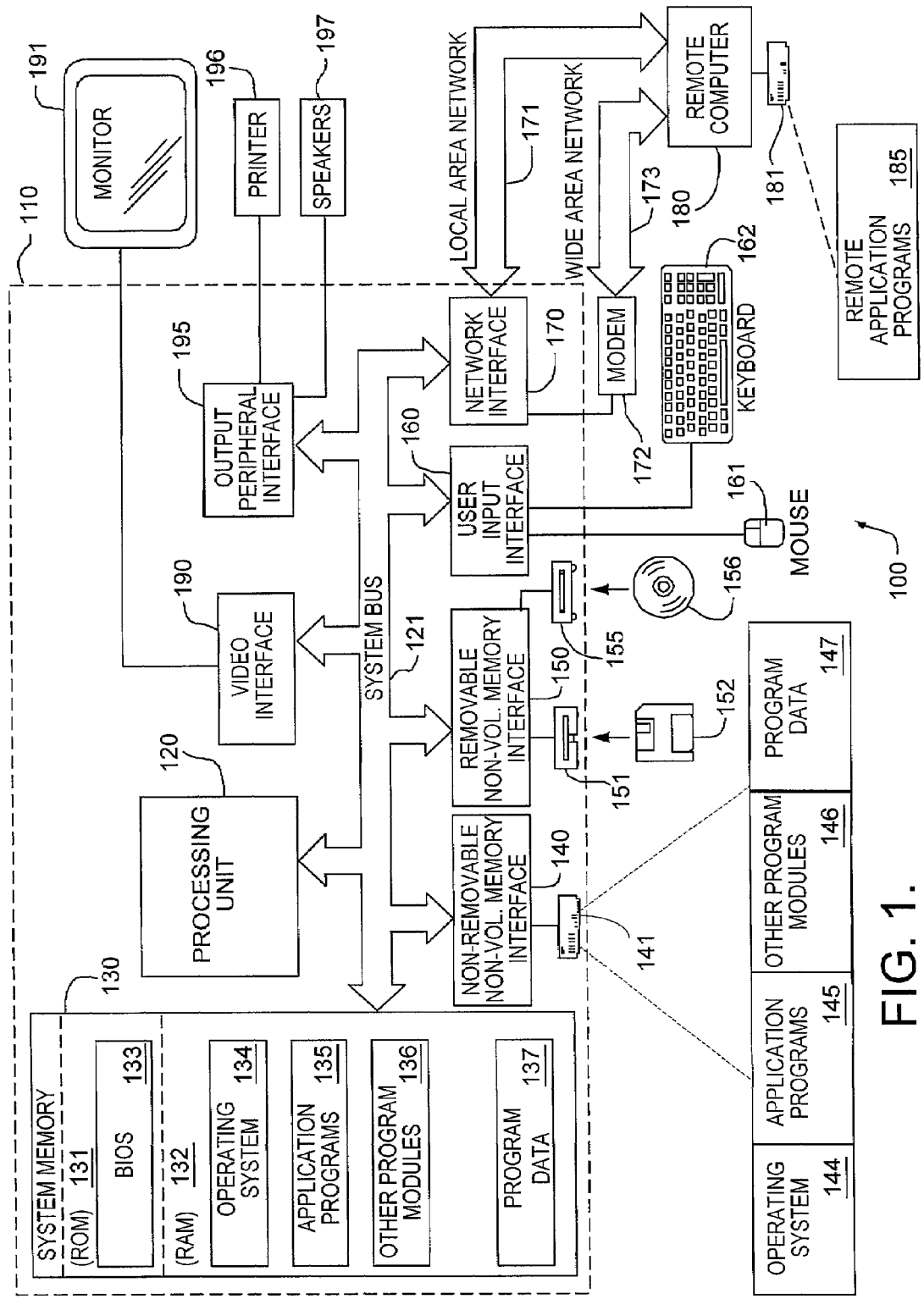
FIG. 1 is a block diagram of a computing system environment suitable for use in implementing the present invention.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected to the system bus 121 through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

System and Method for Switching

Figure 2:
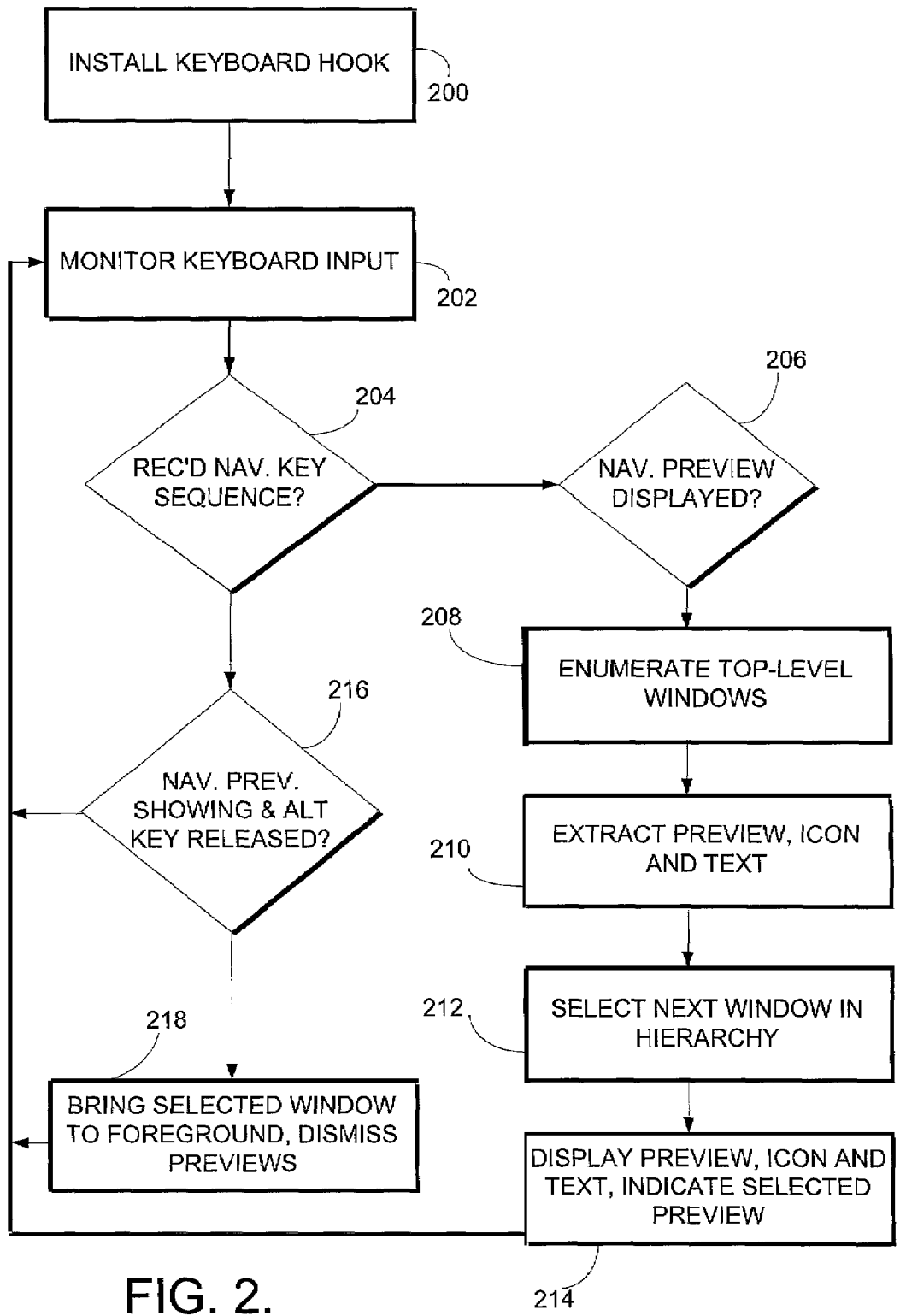
FIG. 2 is a flow diagram illustrating a method according to the present invention.

As seen in FIG. 2, the present invention involves a method and system that allows a user to navigate quickly and efficiently through multiple window applications. The method begins at step 200 by installing a keyboard hook. A system-wide keyboard hook, as is known to those in the field, is a sequence of computer commands that intercepts the input from the keyboard so that it may be acted upon by the remaining steps of the method. More specifically, a keyboard hook is a mechanism, by which a function can intercept events before they reach an application. The function can act on events, modify the events or discard them. A system-wide hook is used for filtering messages of all applications. Next, at step 202, the method monitors the keyboard input for key selections indicative of a desire to navigate among open windows. The key selections are predetermined keys or a combination of keys, that are made known to the user as those which will invoke the navigation operation. In a preferred embodiment, the key selection is depressing and holding the Alt key in combination with pressing Tab key. This combination is already familiar to may users as one which invokes the navigation function. In another embodiment, specialized hardware, such as an Alt+Tab rocker, is added to the keyboard. It should also be understood that other key selections could be used and are within the scope of the present invention. The monitoring step 202 continues at step 204 to determine whether the predetermined keyboard input has been received.

For the remainder of the description, the key sequence will be described using the Alt+Tab combination as the navigation key sequence. If the Alt+Tab key sequence is received, the method determines at step 206 whether the navigation preview is being displayed. The navigation preview is a window displaying an icon for each open window, as well as an icon, text and a preview for the next window in the activation hierarchy. A preview is defined as a graphical display of a window that shows the contents of the window. Presenting a window preview allows a user to rapidly determine the contents of a window so that the user can determine whether the window is sought by the user. Generally, a preview is presented as a thumbnail. A thumbnail is a miniature version of an image or electronic version of a page that allows a quick view of the image or page.

Returning to FIG. 2, if it is determined at step 206 that the navigation preview is not already displayed, then at step 208 the top-level windows are enumerated. Next, at step 210, a preview, an icon and window text for each open window are extracted. The invention thus has the information needed for the navigation display after step 210. The next window in the activation hierarchy is then selected at step 212. If it is determined at step 206 that the previews are already showing, steps 208 and 210 are skipped and the next window in the activation hierarchy is then selected at step 212. In another embodiment, the user may input the Alt+Shift+Tab keystroke so that the previous window in the activation hierarchy is activated. In a further embodiment, instead of the Alt+Tab keystroke, a user may indicate the icon he or she wants to select by using a pointing device, such as a mouse. At step 214, the preview, icon and text for at least the window selected in step 212 is displayed along with icons from each of the other open top-level windows. As more fully described below, depending on the navigation display, the preview, icon and text for each open window may be arranged and displayed with the window selected in step 212 highlighted in some fashion. The system then returns to monitoring the keyboard input at step 202.

Returning to step 202, if the Alt+Tab key sequence is not received, it is determined at step 216 whether the navigation preview is already showing and the Alt key has been released. If the previews are not showing, the system returns to step 202 to monitor the keyboard input. This addresses the scenario where the user has not yet indicated a desire to navigate among the open windows. Further, if the previews are showing and the Alt key has not been released, the system also returns to step 202 to monitor the keyboard input. This addresses the scenario where the user is still in a navigational mode but has not indicated a desire to select a different window. If the previews are showing and the Alt key has been released, the system proceeds to step 218. At step 218, the top-level window corresponding to the selected preview and icon are brought to the foreground and the previews are dismissed.

In use, the invention provides more useful information to a user allowing the user to quickly and efficiently navigate to a desired open window. The user can activate the invention by initiating the navigation key sequence, such as by depressing the Alt and Tab keys. Upon receiving the navigation key sequence in the first instance, the invention will display at least the icons associated with each open window as well as text and a preview of the next window in the activation hierarchy. As long as the user keeps the Alt key depressed the information remains displayed. Successively pressing the Tab key with the Alt key depressed iterates through the activation hierarchy such that successive previews are highlighted. When the user has navigated to the desired window, the Alt key is released to bring the selected window to the forefront.

Figure 3A:
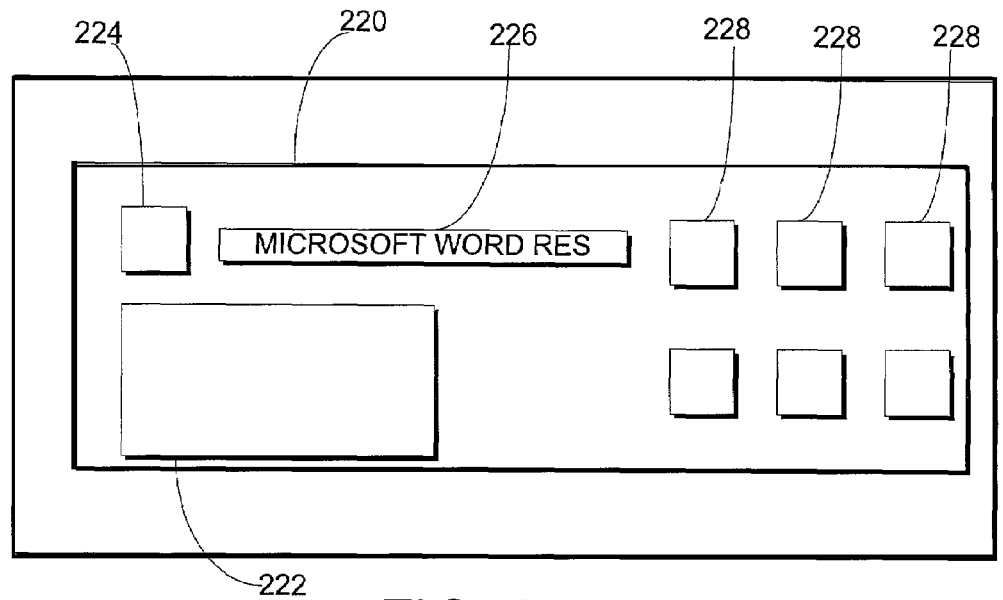
FIG. 3A is a partial screen shot representing a display according to the present invention.

As shown in FIGS. 3A through 3F, the window previews, icons and text descriptions displayed in step 214 may be presented in several different ways. In FIG. 3A, a dialog box 220 is utilized. A window preview 222, icon 224 and text 226 for the currently selected window is presented on the left portion of the dialog box 220 and a number of icons 228 for the remaining top-level windows are presented in order as enumerated in step 208 on the right portion of the box 220 with the next top-level window in the activation hierarchy being presented at the top left position of the right portion of the dialog box. As can be seen from box 220, not only is the icon 224 and text 226 displayed for a selected window, but a preview 222 of the window itself is displayed.

Figure 3B:
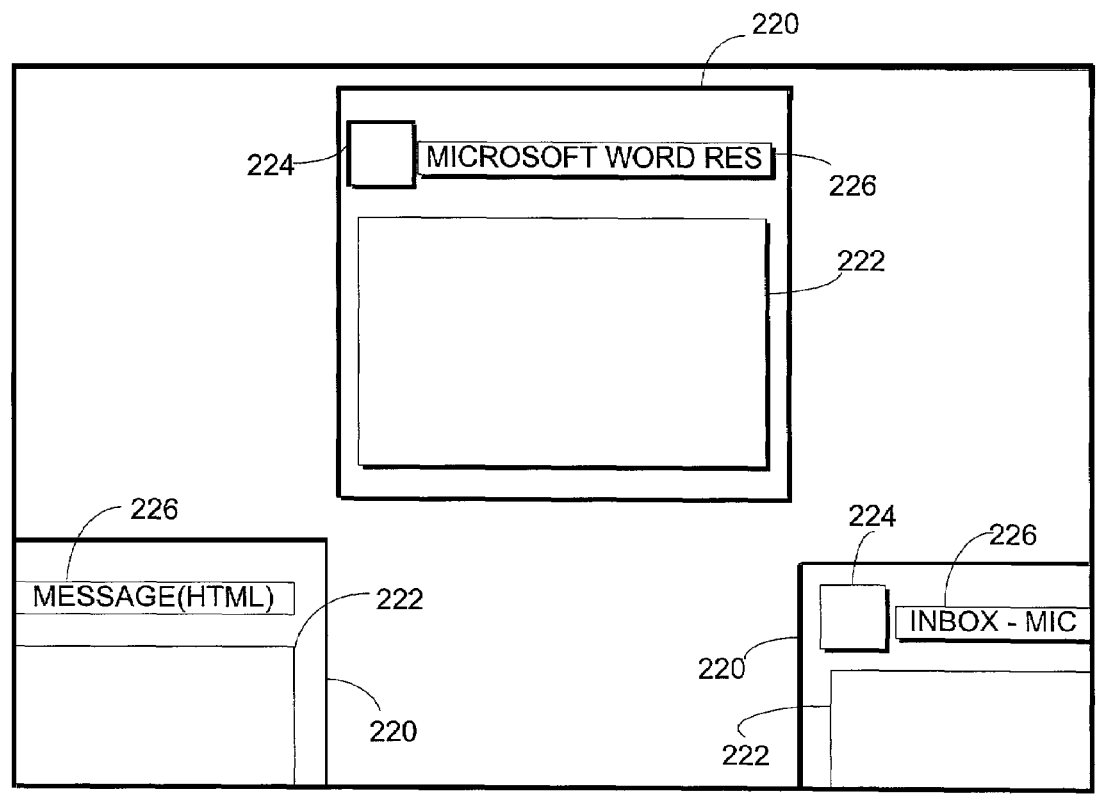
FIG. 3B is a partial screen shot representing a display according to the present invention.

In FIG. 3B, the window previews, icons and text for a number of the top-level windows are presented concurrently. Windows 220 having previews 222, icons 224 and text 226 are arranged in a circular fashion with the selected window presented at the top position of the circle or the position that would represent twelve o'clock on a clock face. The remaining windows in the activation hierarchy are presented in order as enumerated in step 208 beginning to the left of the selected window and continuing around in a counterclockwise manner. When the user presses the Tab key with the Alt key depressed to cycle through the windows, the previews, icons and text shift in a clockwise motion much like a Ferris wheel.

Figure 3C:
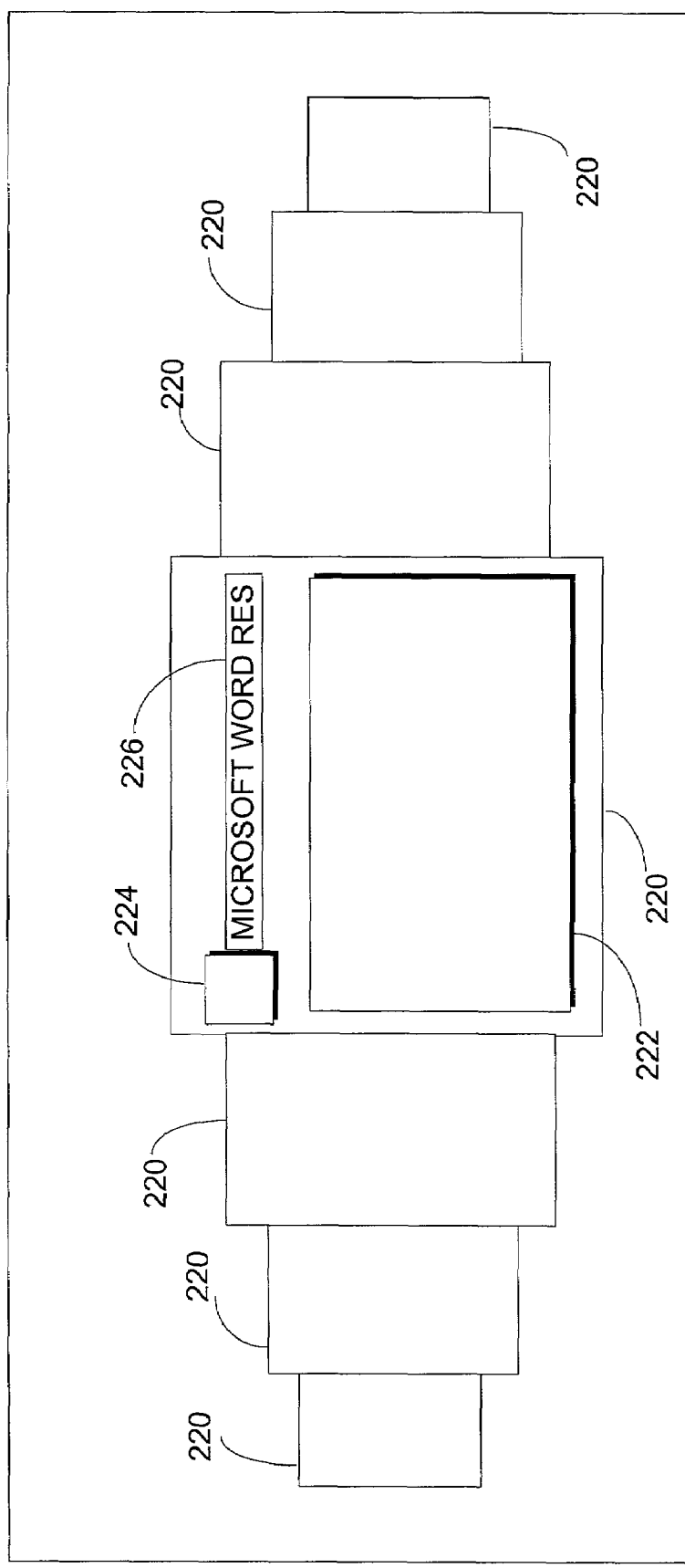
FIG. 3C is a partial screen shot representing a display according to the present invention.

In FIG. 3C, the windows 220 having previews 222, icons 224 and text 226 are again presented concurrently. Although not shown in FIG. 3C, it should be understood that each window 220 contains a preview 222, an icon 224 and text 226. The previews, icons and text are presented in a linear fashion. The selected window is presented in the center of the display on top of the other windows and is larger than the other windows. A portion of the remaining windows as enumerated in step 208 are presented to the left and right of the selected window with the next window in the activation hierarchy immediately to the left of the selected window. The size of the window decreases as the position of the window moves away from the selected center window. When the user presses the Tab button with the Alt key depressed to cycle through the windows, the windows shift so that the selected window is always in the center of the display.

Figure 3D:
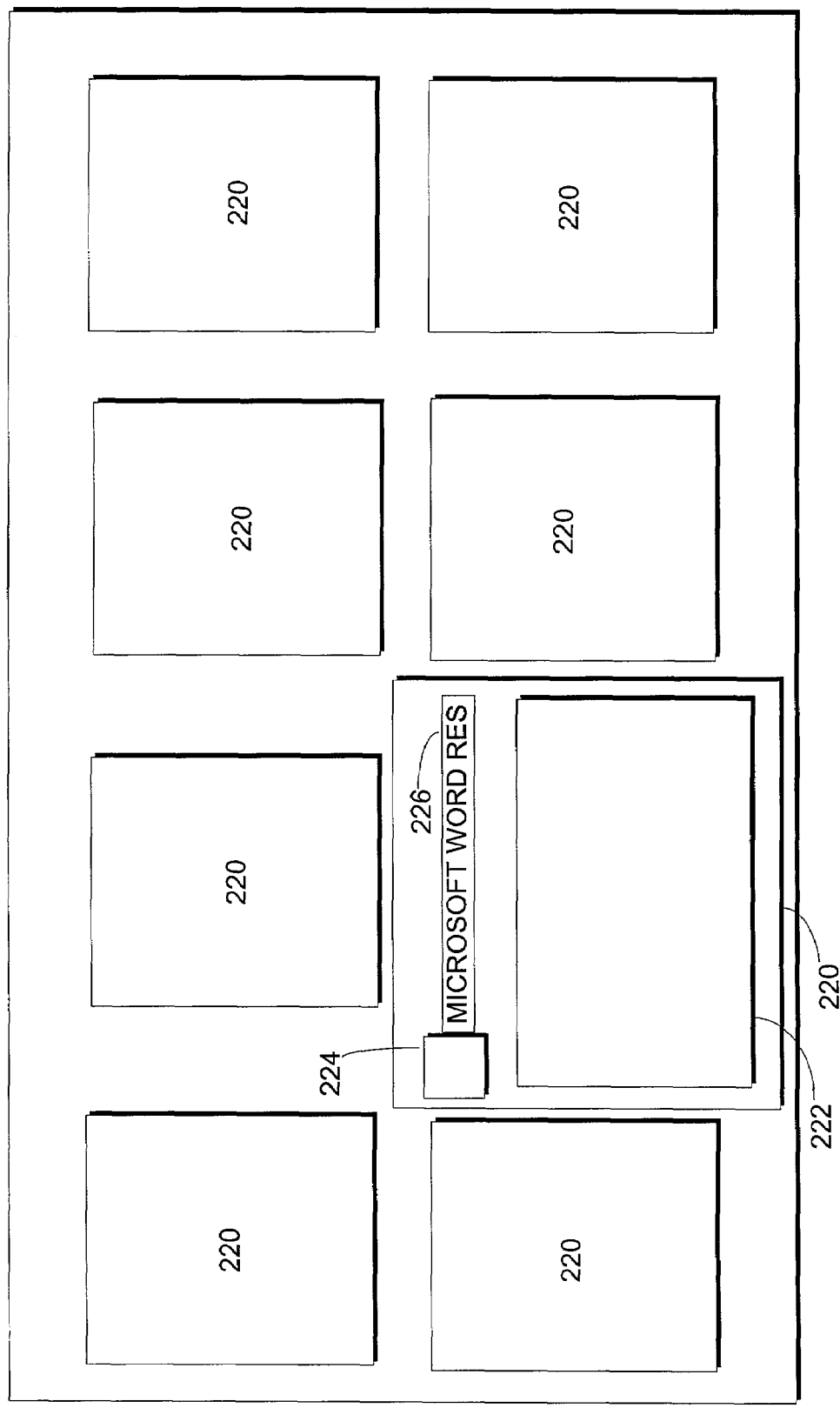
FIG. 3D is a partial screen shot representing a display according to the present invention.

In FIG. 3D, the windows 220 having previews 222, icons 224 and text 226 are again presented concurrently. Although not shown in FIG. 3D, it should be understood that each window 220 contains a preview 222, an icon 224 and text 226. The windows are presented in rows in the order enumerated in step 208 with the current top-level window located in the bottom left position. The first selected window, which is the next window in the activation hierarchy, is located immediately to the right of the current top-level window and is larger than the remaining windows. The selected window is set on top of the windows to each side. The size of the remaining windows depends on the number of windows in the activation hierarchy with the size of the windows decreasing as the number of windows in the activation hierarchy increases. Again, the user can move successively through the windows 220 by successively depressing the Tab key with the Alt key depressed.

Figure 3E:
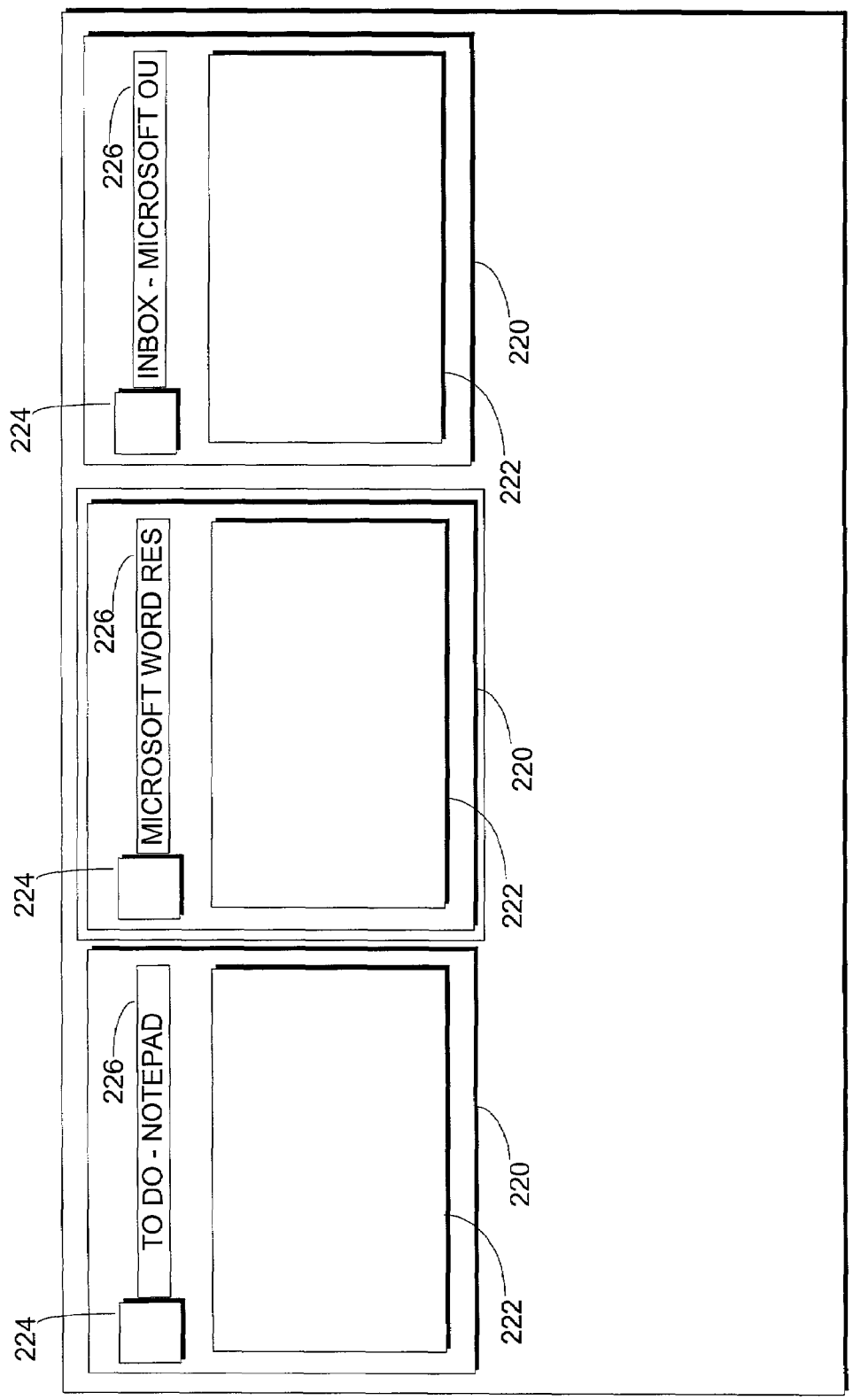
FIG. 3E is a partial screen shot representing a display according to the present invention.

In FIG. 3E, the windows 220 having previews 222, icons 224 and text 226 are presented across the top of the display. In this embodiment, the size of the windows remains constant regardless of how many windows are present in the activation hierarchy. The selected window is presented in the center of the screen. The preview 222, icon 224 and text 226 for the current top-level window is initially presented to the left of the selected window. The preview, icon and text for the final window in the activation hierarchy is presented to the left of the current top-level window. The preview, icon and text for the second window in the activation hierarchy is presented to the right of the selected window, and the preview, icon and text for the third window of the activation hierarchy is presented to the right of the second window in the activation hierarchy. When the user presses the Tab button with the Alt key depressed to cycle through the windows, the window shift to the left so that the selected windows is always in the center of the display.

Figure 3F:
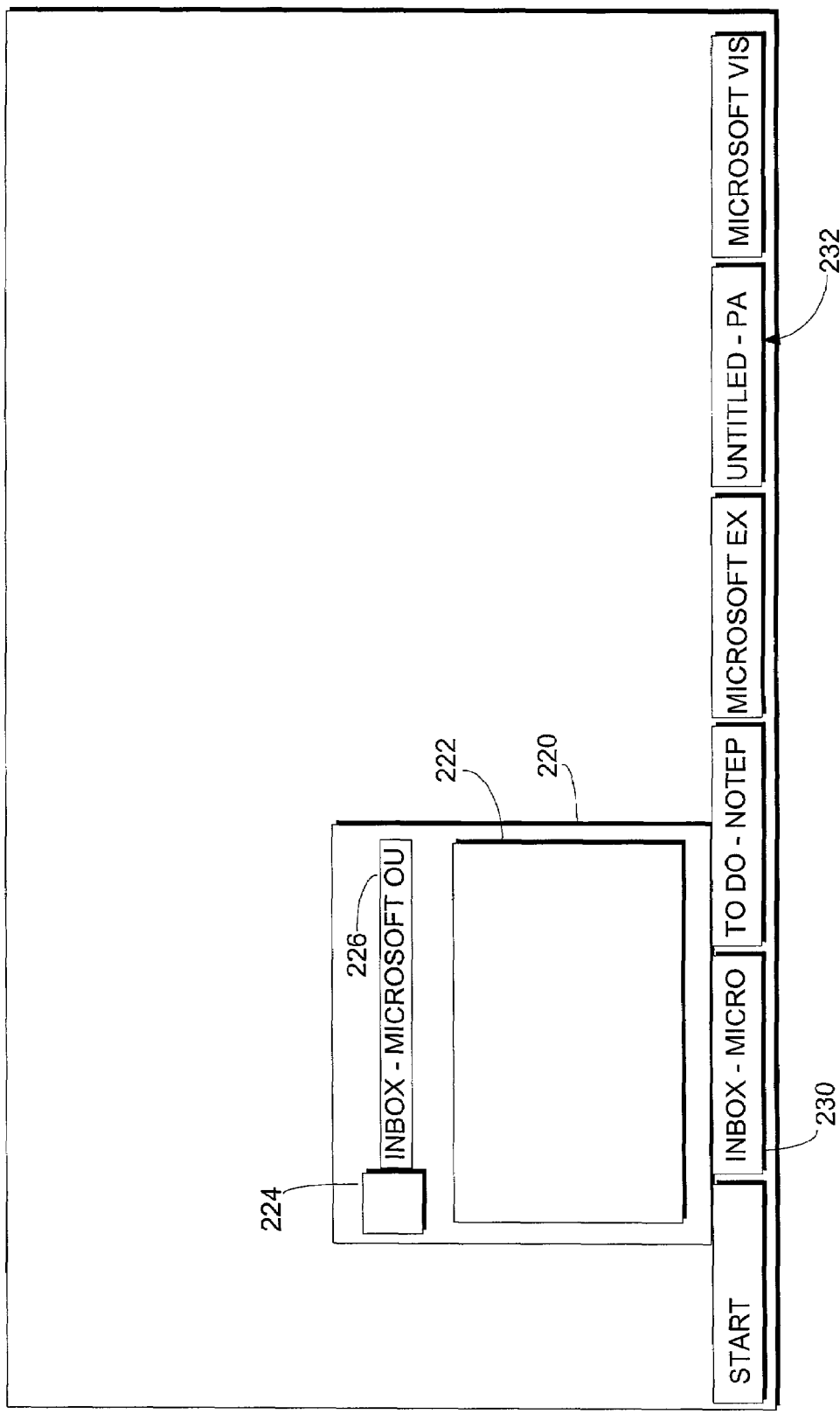
FIG. 3F is a partial screen shot representing a display according to the present invention.
Figure 4:
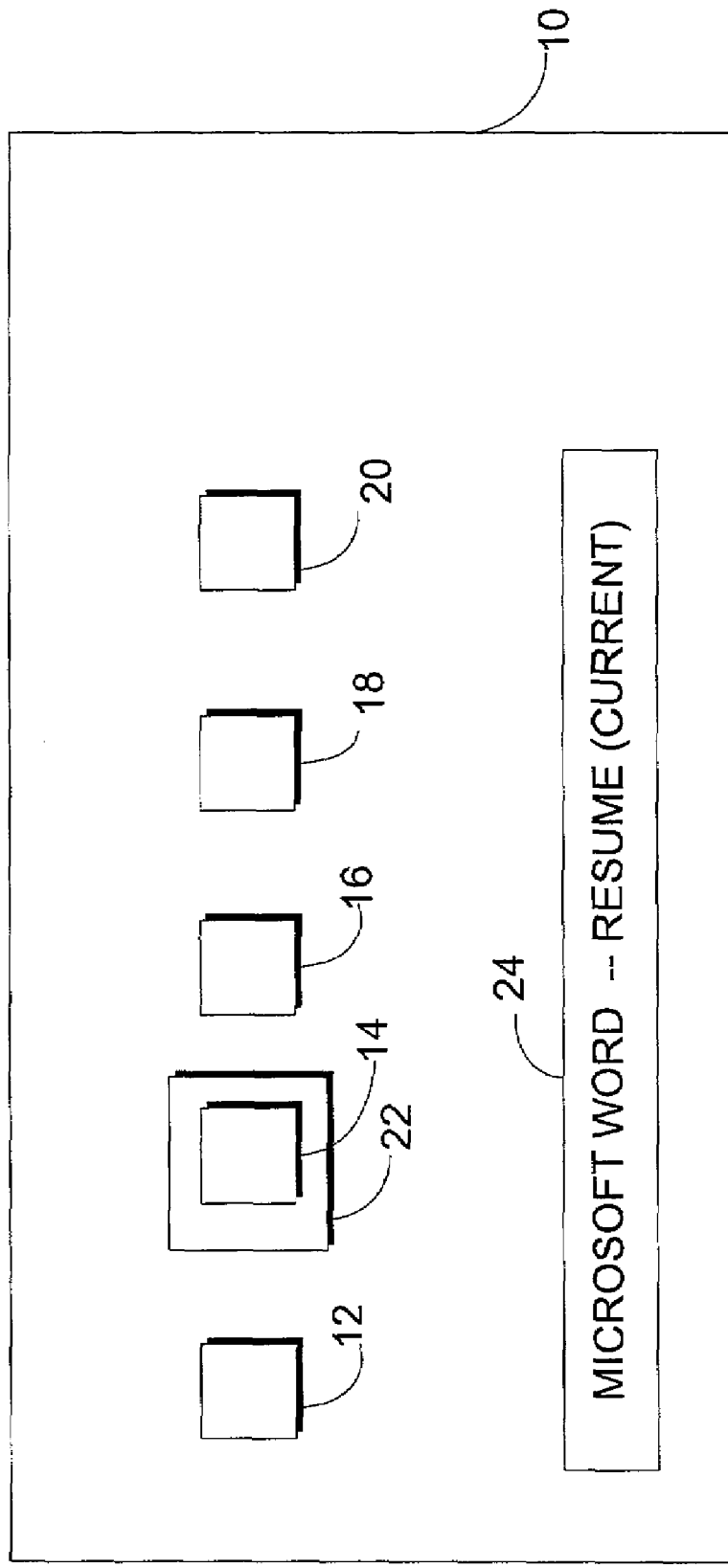
FIG. 4 is a partial screen shot representing a dialog box as per the prior art.

In FIG. 3F, the preview 222, icon 224 and text 226 for the selected window 220 is presented immediately above an icon and text 230 for the application located in a task bar. As with FIG. 3A, the previews, icons and text for the remaining windows 220 in the activation hierarchy are not displayed until the respective window is selected. In this embodiment, as the user successively depresses the Tab key with the Alt key depressed, the navigation preview 220 is successively displayed immediately above the icon and text 230 in the task bar 232.

While a number of different arrangements are shown and described above with reference to FIGS. 3A-3F, it should be understood that the invention is in no way limited to the specific arrangements or displays described above.

The invention provides users an efficient and easy-to-use navigational tool to switch between open application windows on their computer. The users are presented with not only an icon and related text, but are also presented with an actual preview of a selected window. If a user has multiple windows open using the same application, the user can easily determine which of the open windows is desired through the provided preview.

Alternate embodiments of the present invention will become apparent to those skilled in the art to which it pertains upon review of the specification, including the drawing figures. The various computer systems and components shown in FIGS. 1-3F and described in the specification are merely exemplary of those suitable for use in connection with the present invention. Accordingly, the scope of the present invention is defined by the appended claims rather than the foregoing description.

We claim:

1. A method for use in a computer system, said computer system having a graphical operating system, for switching between a plurality of open application windows, comprising:
    monitoring for switching input indicative of a desire to switch from a current open application window to another of the plurality of open application windows;
    upon receipt of the switching input, displaying, over the current open application window, an extracted graphical preview comprising a live running view that reflects real-time changes of actual content currently within the another one of the plurality of open application windows;
    monitoring for display input indicative of a desire to make the displayed preview the new current open application window; and
    upon receipt of the display input, switching the display from the current open application window to the new current open application window.

2. The method of claim 1, further comprising displaying, along with the preview, an icon and a text description associated with the preview.

3. The method of claim 2, further comprising, upon receipt of the switching input, displaying an extracted graphical preview of the content for each of the plurality of open application windows.

4. The method of claim 3, further comprising displaying, along with the preview for each of the plurality of open application windows, an icon and a text description associated with a corresponding preview.

5. The method of claim 1, wherein each of the plurality of open application windows is ranked according to an activation hierarchy, and wherein the displayed preview is the window immediately succeeding the current open application window in the activation hierarchy.

6. The method of claim 5, further comprising:
    monitoring, after display of the preview, for additional input indicative of a desire to view a preview of the next open application window in the activation hierarchy; and
    upon receipt of the additional input, displaying an extracted graphical preview of the content for the next open application window in the activation hierarchy.

7. The method of claim 1, further comprising:
    upon receipt of the switching input, concurrently displaying description information for each of the plurality of open application windows.

8. A computer system having a processor, memory, display, and an operating environment, the computer system operable to execute the method recited in claim 1.

9. The method of claim 1, wherein the switching input is independent of any open application.

10. The method of claim 1, wherein the switching input comprises a keyboard input.

11. A method for use in a computer system, said computer system having a graphical operating system, for switching between a plurality of open windows that are ranked according to an activation hierarchy comprising:
    monitoring for a switching activation signal;
    upon receipt of the switching activation signal, displaying, over the open windows, an extracted graphical preview comprising a live running view that reflects real-time changes of actual content currently within the next open window in the activation hierarchy;
    monitoring for a display command to activate and display the window corresponding to the displayed preview; and
    upon receipt of the display command, activating the open window corresponding to the displayed preview.

12. The method of claim 11, further comprising displaying, along with the preview, an icon and a text description associated with the preview.

13. The method of claim 11, further comprising, upon receipt of the switching activation signal, displaying an extracted graphical preview of the content for each of the plurality of open application windows.

14. The method of claim 11, further comprising:
    monitoring for a next preview signal; and
    upon receipt of the next preview signal, displaying an extracted graphical preview of the content of the window immediately succeeding the window corresponding to the currently displayed preview in the activation hierarchy.

15. A computer-readable medium having computer-executable instructions for performing the method as recited in claim 11.

16. A computer system having a processor, memory, display, and an operating environment, the computer system operable to execute the method recited in claim 11.

17. The method of claim 11, further comprising:
    upon receipt of the switching activation signal, concurrently displaying description information for each of the plurality of open application windows.

18. The method of claim 11, wherein the switching activation signal is independent of any open application.

19. The method of claim 11, wherein the switching activation signal comprises a keyboard input.

20. A method for use in a computer system, said computer system having a graphical operating system, for switching between a plurality of open application windows, comprising:
    monitoring for switching input indicative of a desire to switch from a current open application window to another of the plurality of open application windows;
    upon receipt of the switching input, displaying, over the current open application window, an extracted graphical preview comprising a live running view that reflects real-time changes of actual content currently within the another one of the plurality of open application windows, wherein the extracted graphical preview is displayed adjacent a button in a task bar, the button corresponding with the another one of the plurality of open application windows;
    monitoring for display input indicative of a desire to make the displayed preview the new current open application window; and
    upon receipt of the display input, switching the display from the current open application window to the new current open application window.

21. One or more computer-storage media embodying instructions for performing a method for use in a computer system, said computer system having a graphical operating system, for switching between a plurality of open application windows, comprising:
- monitoring for switching input indicative of a desire to switch from a current open application window to another of the plurality of open application windows;
- upon receipt of the switching input, displaying, over the current open application window, an extracted graphical preview comprising a live running view that reflects real-time changes of actual content currently within the another one of the plurality of open application windows;
- monitoring for display input indicative of a desire to make the displayed preview the new current open application window; and
- upon receipt of the display input, switching the display from the current open application window to the new current open application window.

* * * * *